March 11, 1958 H. A. LINCOLN 2,826,428
REPLACEABLE SPLASH GUARD FOR TRUCKS
Filed March 3, 1953
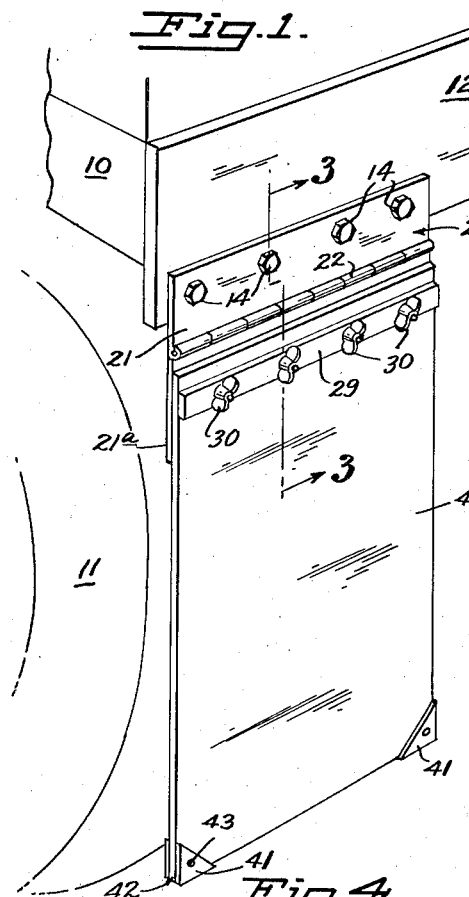
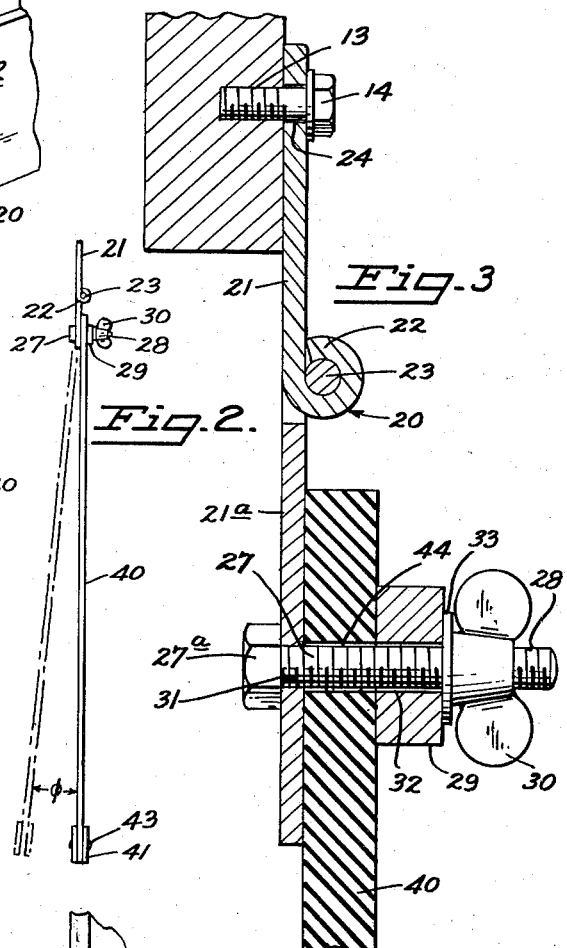
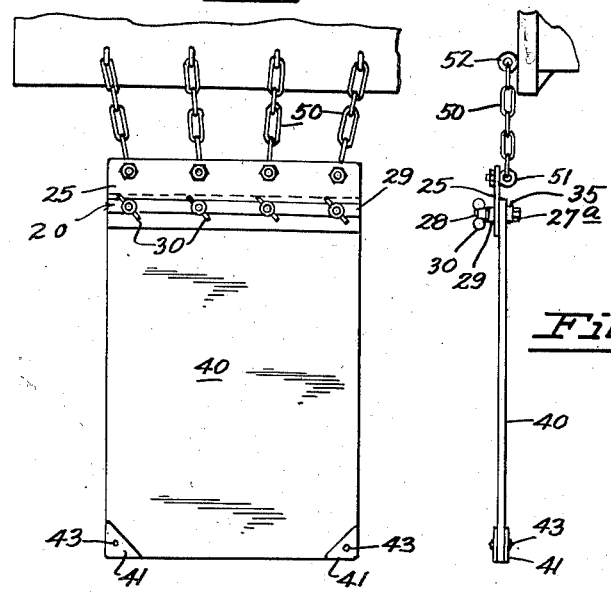
INVENTOR.
HAROLD A. LINCOLN
BY
ATTORNEY

2,826,428

REPLACEABLE SPLASH GUARD FOR TRUCKS

Harold A. Lincoln, Daly City, Calif.

Application March 3, 1953, Serial No. 339,980

3 Claims. (Cl. 280—154.5)

This invention relates to splash guards which are placed behind the rear wheels of vehicles in order to prevent mud and water being thrown rearwardly on to other vehicles coming up behind the leading vehicle.

More specifically, this invention relates to splash guards suitable for use on trucks and similar vehicles having insufficient fenders, or no fenders at all, to block the throwing of mud, water, or rocks and the like from the rear wheels. This problem is generally presented by load carrying vehicles having overhanging bodies, but may exist for other types of motor vehicles as well. It is customary, in such cases, for state regulations to require rear splash guards, and to prescribe a penalty for infraction of such regulations.

Heretofore splash guards, adapted for use on trucks and the like, have generally been made of rubber or similar flexible material and are, consequently, fairly expensive, particularly in the case of trucks having dual wheels where the splash guards must be of relatively large size. When such splash guards are used on vehicles traveling over rough roads, for example trucks and trailers used in construction work or logging, the splash guards are subjected to considerable abuse and hard wear. If a portion of the splash guard is torn loose, or if an entire section is torn off, the splash guard must be replaced with new splash guards.

In order to replace the splash guard it has generally been necessary to return to a base of operations where a new complete splash guard unit could be installed. It was not feasible to carry spare splash guard units because of the time and labor factors involved. The result is that replacement of splash guards becomes a large item of expense with such equipment not to mention the delay and annoyance involved, particularly when a driver becomes involved with the local state police.

The present invention is directed to a solution of such problems, and particularly to a rugged, durable, easily manufactured splash guard assembly and holder that will permit the use of cheap, expendable, easily replaced splash guards.

Another object of the present invention is to provide a clamp type splash guard holder that is mounted for freedom of movement with respect to the rear wheel of the vehicle so that a relatively rigid non-flexible splash guard may be provided from whatever material is at hand.

Another object of the present invention is to provide a simple easily manipulated splash guard holder that will allow quick replacement of the splash guard, by the driver while he is still on the highway, and without the necessity of proceeding to a repair base.

Another object of the invention is to provide a splash guard holder that may be manipulated by hand and without the use of tools.

Another object is to provide a device that permits the use of stiff rigid splash guards that may be readily fabricated out of available materials, such as fiberboard, wood, metal or the like, without requiring any special molds, dies, jigs or tools.

Other objects and advantages of the present invention will readily appear from the following description and from the drawings in which:

Fig. 1 is a perspective view of one form of a splash guard, according to the present invention, showing it installed adjacent the rear wheels of a truck;

Fig. 2 is a view in side elevation of the splash guard of Fig. 1, taken from the left side;

Fig. 3 is a view in enlarged cross section along the line 3—3 of Fig. 1;

Fig. 4 is a view in elevation of a modified splash guard according to the present invention;

Fig. 5 is a view in side elevation of the device of Fig. 4 taken from the left side.

Referring to the form of the invention illustrated in Figs. 1 to 3, 10 indicates a motor vehicle having a double tired rear wheel 11 and a rear beam member 12 having a plurality of threaded openings 13.

Secured to the beam 12 by cap screws 14 is a splash guard holder 20 comprising two rectangular plate sections 21 and 21a, each having hinge portions 22 permitting a limited pivotal movement of the sections, relative to each other, about the pintle 23. The upper plate section 21 has a plurality of apertures 24 to receive the cap screws 14, so that that upper plate section is rigid with the beam 12 when installed.

The bottom portion of the holder 20 includes the plate 21a, rear clamp members such as the bolts 27 having large head portions 27a and threaded portions 28, a front clamp bar 29, and wing nuts 30. The plate section 21a may have a series of threaded apertures 31 to receive the threaded bolt portions 28 so that the latter may be threaded through the plate to extend outwardly on the other side. If desired an apertured rear clamp bar 35 (Fig. 5) may be positioned between the bolt heads 27a and the plate 21a; or the clamp members 27 may be formed as a single integral unit with the threads being later cut into the projecting members 28. A further modification is for the projecting members 28 to be secured directly to the plate 21a thereby in effect making the members 27 and 21a as one piece instead of as two pieces.

The front clamp bar 29 likewise has openings 32, spaced to correspond to the threaded projections 28. Resilient washers 33 and the wing nuts 30 complete the clamp structure.

Detachably secured by the clamp holder 20 is a splash guard 40. The splash guard 40 may be constructed of almost any available material, rigid or flexible. Preferably, the splash guard is of an inexpensive, abundant material such as wall board or fibre board, which may be easily cut to the desired size and shape. Other materials, such as rubber, plastic, wood, or even metal are suitable, however. The only requirement is that the material used be of sufficient strength to offer resistance to the splashing of mud, water, rocks, air currents and the like. Corner protecting members 41 may be secured on either side of the free corners 42 by any suitable fastening means 43 to give additional life to the assembly.

It may be observed that the splash guard holder 20 provides an easily and quickly operated means to both support the splash guard 40 and to facilitate its replacement. As best seen in Fig. 3, a damaged splash guard 40 may be replaced by simply unscrewing the wing nuts 30, removing the clamp bar 29, and removing the old splash guard from the projections 28. Each splash guard has openings 44 punched or bored through its upper portion to receive the projections 28. The new splash guard is positioned on the projections, and the clamp bar 29 again secured in position by the wing nuts 30.

It is evident that replacement of a splash guard requires but a few moments time, and no tools, since the wing nuts 30 are readily manipulated by hand. The hinged connection about pin 23 permits freedom of movement in a direction away from the wheels of the vehicle with only a limited motion towards the wheels, as indicated by the angle φ in Fig. 2. This feature offers additional protection to the splash guard 40. The clamp type holder permits the use of rigid, inexpensive, less durable materials for the splash guard, due to the ease of replacement.

A modified form of the holder 20 is shown in Figs. 4 and 5. In this form, the holder 20 consists of a single plate 25 instead of the two hinged sections 21 and 21a. The clamp mechanism is similar to that shown in Figs. 1 to 3, except that an additional spacer bar 35 is positioned between the bolt heads 27a and the single plate 25. Again, variations within the scope of the invention, are of course, included.

Flexibility is given to this modified form by a series of chain-like supporting links 50. A free swinging connection between the chains 50 and the holder 20 and beam 12 may be provided by any suitable means, such as ring bolts 51 and 52. The link suspension of the holder 20 by the chains 50 allows a free swinging movement of the entire assembly with respect to the motor vehicle, while the splash guard holder combination again permits the use of rigid inexpensive materials for the splash guard 40.

By the above constructions, the driver of a motor vehicle need not worry about returning to a repair base to replace a torn or damaged splash guard, but can make the replacement himself, on the highway, and in a matter of minutes. One or two spare splash guards may be carried by the driver for this purpose. However, it would not be a difficult matter to fabricate a splash guard out of available materials, should no spare prefabricated splash guards be on hand. This is possible because of the replaceable nature of the splash guard and the fact that the permanent structure of the invention is constructed to give the necessary support to any material that may be at hand in an emergency. A roadside repair can even be made with a burlap bag held at its top edge between the plate 21a and bar 29 and having a small bit of gravel in the sack to hold it down. The entire structure of the invention lends itself to ready adaptation to any circumstance.

These benefits are due to the unique construction of the separate, easily manipulated splash guard holder that permits use of a separate, rigid, easily replaceable splash guard. It is also apparent that the present invention presents an easily manufactured inexpensive device, that can evoke great savings in operating costs, while insuring proper compliance with state regulations at all times.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. For use with a motor vehicle having an overhanging body, a removable rear wheel splash guard and splash guard holder comprising a plurality of chain-like links adapted to be secured to said overhanging body; a splash guard holder including a plate member having openings to receive said respective supporting links, a clamp bar opposed to said plate member, and clamping means to urge said plate member and clamp bar together; and a removable splash guard detachably engaged by said splash guard holder; whereby on damage to the splash guard said holder may be released to permit replacement of said splash guard.

2. A vehicle splash guard and holder combination comprising a plurality of flexible supporting links; a splash guard holder including a rigid apertured plate member having one set of apertures engaging said links and other set of apertures, a plurality of rigid clamp members having projecting portions extending outwardly through said other set of apertures, a clamp bar having openings adapted to receive said projecting portions, and threaded means coacting with said projecting portions to urge said clamp bar toward said plate member; and a rigid rectangular splash guard having openings likewise adapted to receive said projecting members, whereby said splash guard may be detachably clamped between said plate member and said clamp bar.

3. For use with a motor vehicle having an overhanging body, a removable rear wheel splash guard and splash guard holder comprising a plurality of links adapted to be secured to said overhanging body; a splash guard holder including a plate member having openings to receive said respective supporting links, a clamp bar opposed to said plate member, and clamping means to urge said plate member and clamp bar together; and a removable splash guard detachably engaged by said splash guard holder; whereby on damage to the splash guard said holder may be released to permit replacement of said splash guard.

References Cited in the file of this patent

UNITED STATES PATENTS

| | | |
|---|---|---|
| 2,038,234 | Olen | Apr. 21, 1936 |
| 2,414,676 | Taurman et al. | Jan. 21, 1947 |
| 2,591,196 | Post | Apr. 1, 1952 |
| 2,619,363 | Wenham et al. | Nov. 25, 1952 |
| 2,640,714 | Garner et al. | June 2, 1953 |
| 2,652,266 | Miller | Sept. 15, 1953 |

FOREIGN PATENTS

| | | |
|---|---|---|
| 22,564 of 1935 | Australia | Feb. 18, 1936 |
| 22,811 | Sweden | Jan. 18, 1917 |